United States Patent
Mendonca et al.

(10) Patent No.: US 8,296,847 B2
(45) Date of Patent: *Oct. 23, 2012

(54) METHOD OF MANAGING UTILIZATION OF NETWORK INTRUSION DETECTION SYSTEMS IN A DYNAMIC DATA CENTER

(75) Inventors: John Mendonca, Redwood City, CA (US); Amit Raikar, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1688 days.

This patent is subject to a terminal disclaimer.

(21) Appl. No.: 10/627,017

(22) Filed: Jul. 25, 2003

(65) Prior Publication Data

US 2005/0022022 A1   Jan. 27, 2005

(51) Int. Cl.
*G06F 7/04* (2006.01)
(52) U.S. Cl. ........... 726/23; 726/22; 726/24; 726/25; 726/11; 709/223; 709/224; 709/225
(58) Field of Classification Search ............... None
See application file for complete search history.

(56) References Cited

U.S. PATENT DOCUMENTS

| | | | | |
|---|---|---|---|---|
| 6,484,315 | B1 * | 11/2002 | Ziese | 717/173 |
| 6,578,147 | B1 * | 6/2003 | Shanklin et al. | 726/22 |
| 6,671,811 | B1 * | 12/2003 | Diep et al. | 726/23 |
| 6,954,775 | B1 * | 10/2005 | Shanklin et al. | 718/105 |
| 7,574,740 | B1 * | 8/2009 | Kennis | 726/22 |
| 2002/0184532 | A1 * | 12/2002 | Hackenberger et al. | 713/201 |
| 2003/0154399 | A1 * | 8/2003 | Zuk et al. | 713/201 |

FOREIGN PATENT DOCUMENTS

| | | | |
|---|---|---|---|
| DE | 102 49 842 A1 | | 5/2003 |
| GB | 2387681 A | * | 10/2003 |
| WO | WO 02096028 A1 | * | 11/2002 |

* cited by examiner

*Primary Examiner* — Pramila Parthasarathy

(57) ABSTRACT

A method of managing utilization of network intrusion detection systems in a dynamic data center is provided. A plurality of network intrusion detection systems are provided, each being networked so that utilization of each network intrusion detection system can be based on demand for the network intrusion detection systems in the dynamic data center. A monitoring policy and a plurality of monitoring points to be monitored on a network with any of the network intrusion detection systems are received. Further, the monitoring of the monitoring points is automatically arranged using the network intrusion detection systems and the monitoring policy.

20 Claims, 3 Drawing Sheets

METHOD OF MANAGING UTILIZATION OF NETWORK INTRUSION DETECTION SYSTEMS IN A DYNAMIC DATA CENTER

BACKGROUND OF THE INVENTION

1. Field of the Invention

The present invention generally relates to data centers. More particularly, the present invention relates to managing utilization of network intrusion detection systems in a dynamic data center.

2. Related Art

Network intrusion detection systems are becoming essential to building a safe a secure network. The network intrusion detection system can be utilized to analyze or inspect inbound and outbound network communication data. In particular, the network intrusion detection system can identify suspicious patterns or anomalies to normal patterns that may indicate malicious activity or an attack on the network. Typically, the network intrusion detection systems are distributed throughout the network. In many cases, the network intrusion detection systems are positioned to monitor network communication data near firewalls. Both outside intruders and inside intruders can be detected with network intrusion detection system. There are many implementations for the network intrusion detection system. The network intrusion detection system may be a specialized hardware component with specialized network intrusion detection software. Alternatively, the specialized network intrusion detection software can be operated on general purpose hardware. Moreover, the specialized network intrusion detection software as well as other applications can be operated on general purpose hardware.

Although the network intrusion detection system is useful, incorporating the network intrusion detection system into the network can be difficult. Typically, the hardware portion of the network intrusion detection system is manually installed and wired into the network. This can be an error prone operation. Moreover, the software component of the network intrusion detection system is manually installed and configured. This can also be an error prone process. Additionally, the network resources such as a firewall, a gateway system, a network switch, and a network router, have to be manually configured to route the network communication data from the appropriate monitoring points on the network to the appropriate network intrusion detection systems. Even after this effort, the capacity of the network intrusion detection systems may be underutilized or exceeded at various monitoring points, causing inefficient use of the network intrusion detection systems.

In sum, the current process of incorporating network intrusion detection systems into a network is costly, time consuming, and inefficient.

SUMMARY OF THE INVENTION

A method of managing utilization of network intrusion detection systems in a dynamic data center is provided. A plurality of network intrusion detection systems are provided, each being networked so that utilization of each network intrusion detection system can be based on demand for the network intrusion detection systems in the dynamic data center. A monitoring policy and a plurality of monitoring points to be monitored on a network with any of the network intrusion detection systems are received. Further, the monitoring of the monitoring points is automatically arranged using the network intrusion detection systems and the monitoring policy.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1:
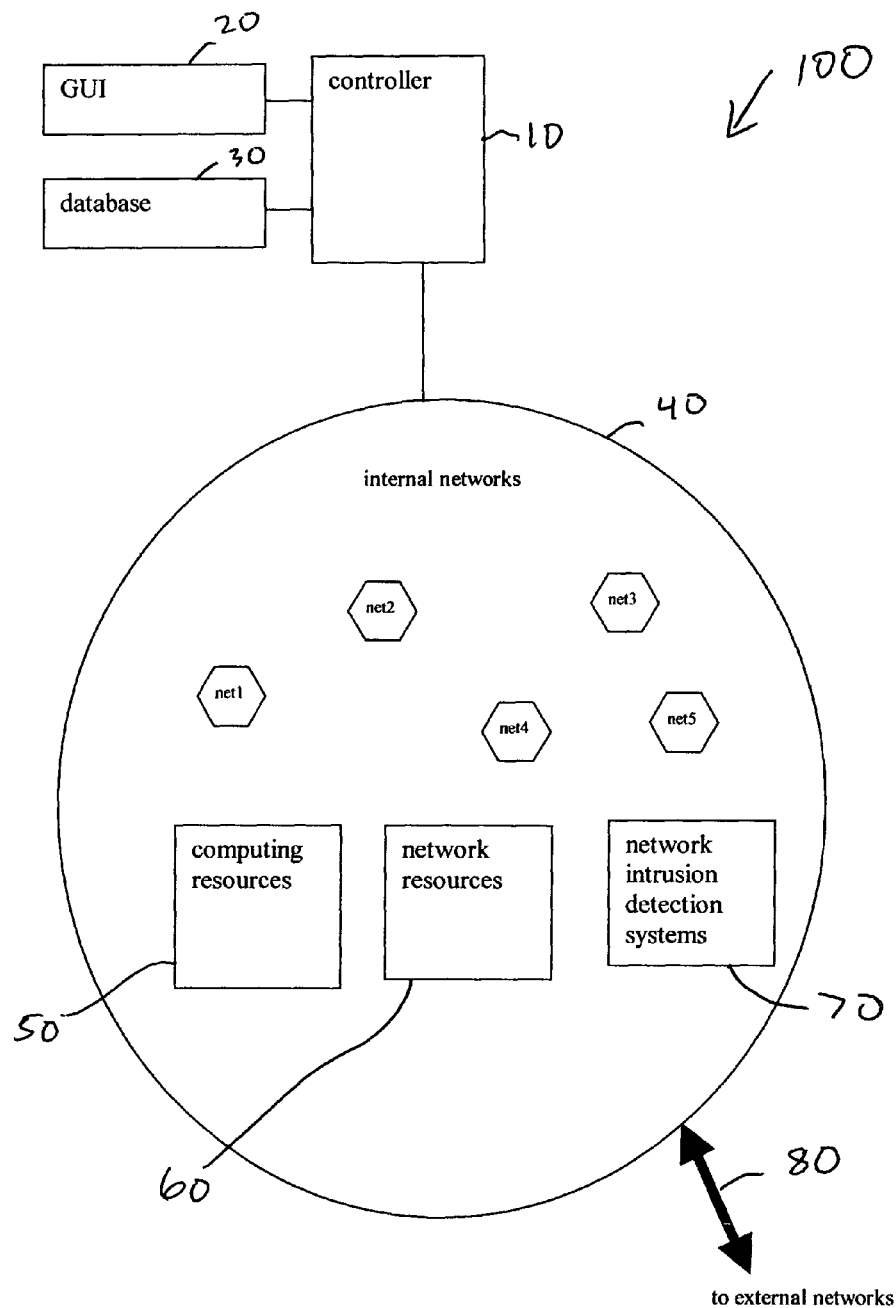
FIG. 1 illustrates a dynamic data center in accordance with an embodiment of the present invention, showing a plurality of network intrusion detection systems.

FIG. 1 illustrates a dynamic data center 100 in accordance with an embodiment of the present invention, showing a plurality of network intrusion detection systems 70. In the dynamic data center 100, the network intrusion detection systems 70 can be automatically deployed and released to provide efficient utilization of the network intrusion detection systems 70.

The dynamic data center 100 has a controller 10, a graphical user interface (GUI) 20, a database 30, a plurality of internal networks 40, and a communication link 80 to communicate with external networks (e.g., the Internet). The internal networks 40 include net1, net2, net3, net4 and net5. In practice, resources from the computing resources pool 50, the network resources pool 60, and the network intrusion detection systems pool 70 are selected to form the internal networks 40 (e.g., net1, net2, net3, net4 and net5). Moreover, the resources in the computing resources pool 50, the network resources pool 60, and the network intrusion detection systems pool 70 are networked and can be automatically and selectively organized into an internal network 40 (e.g., net1, net2, net3, net4 and net5) to provide a particular service (e.g., web site operation).

In an embodiment, there are various types of computing resources. Examples of these various types of computing resources include a server, a workstation, and a personal computer. In an embodiment, there are various types of networking resources. Examples of these various types of networking resources include a firewall, a gateway system, a network switch, and a network router.

Moreover, the dynamic data center 100 has the capability to provision an available resource from the computing resources pool 50, the network resources pool 60, and the network intrusion detection systems pool 70 to provide a service, whereas this provisioning can be performed via the controller 10. In an embodiment, the dynamic data center 100 is a utility data center developed by the Hewlett-Packard Company. In particular, the controller 10 enables the control and configuration of the resources in the computing resources pool 50, the network resources pool 60, and the network intrusion detection systems pool 70 for the internal networks 40 (e.g., net1, net2, net3 net4 and net5). The GUI 20 enables a user to create a desired service supported by a network, which is then provided by a group of resources under the control of the controller 10. The database 30 includes information associated with each resource in the computing resources pool 50, the network resources pool 60, and the network intrusion detection systems pool 70. This information includes the configuration state of each resource.

As described above, the network intrusion detection systems in the network intrusion detection systems pool 70 are networked or pre-wired. Hence, utilization of each network intrusion detection system can be based on demand for the network intrusion detection systems in the dynamic data center 100 unlike the prior process where the network intrusion detection systems were inefficiently utilized. Additionally, the controller 10 is responsible for automatically performing any configuration modification to any of the resources in the computing resources pool 50, the network resources pool 60, and the network intrusion detection systems pool 70, avoiding the manual and error prone prior processes.

The GUI 20 can be utilized to receive the monitoring policy and a plurality of monitoring points to be monitored on a network (e.g., net1, net2, net3, net4 and net5) with any of the network intrusion detection systems in the network intrusion detection systems pool 70. The controller 10 automatically arranges the monitoring of the monitoring points using the network intrusion detection systems in the network intrusion detection systems pool 70 and the monitoring policy in an integrated manner with the resources of the computing resources pool 50 and the network resources pool 60. The monitoring policy can include a variety of information. For example, the monitoring policy can indicate the filtering technique (whether to analyze all or a portion of the network communication data that it receives). Moreover, the monitoring policy can indicate how particular events or classes of events generated by the network intrusion detection systems are to be processed (e.g., which system to send the events to and with which priority).

Figure 2:
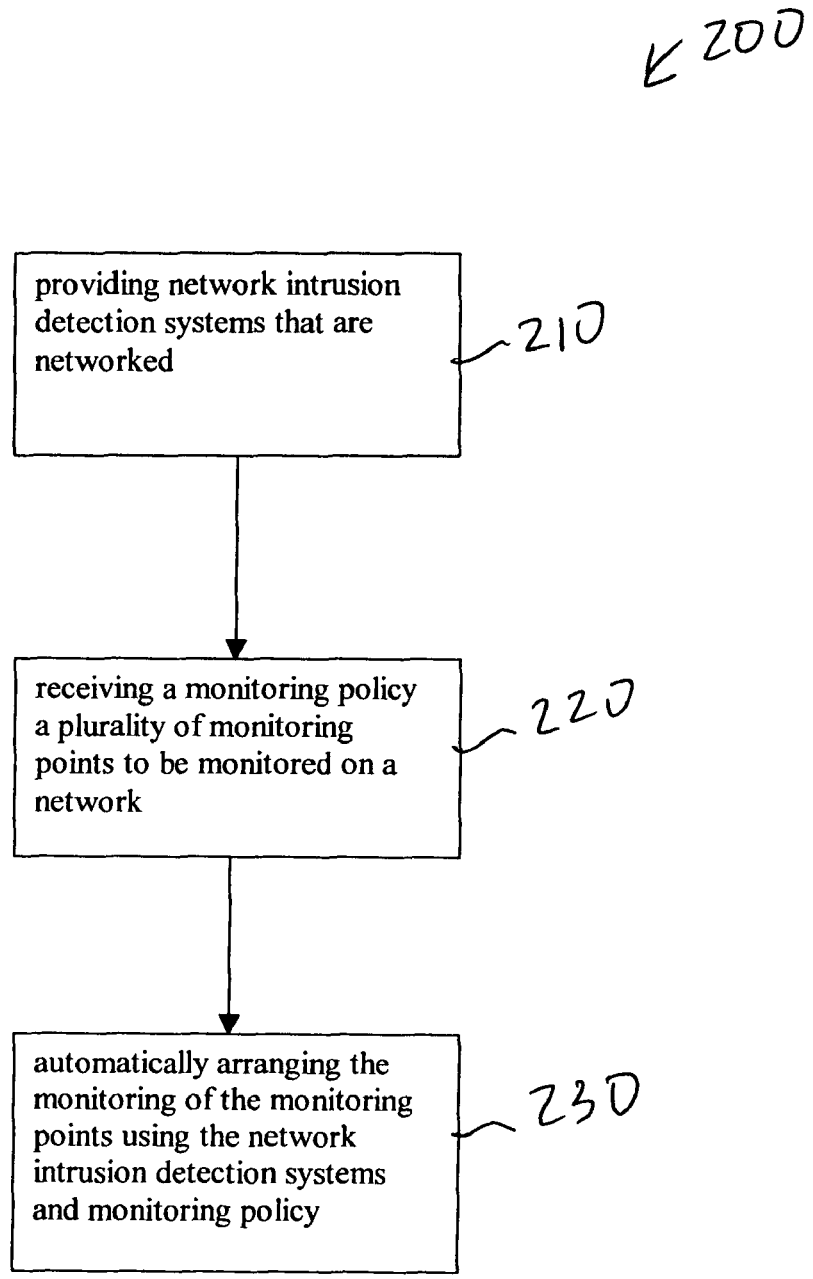
FIG. 2 illustrates a flow chart showing a method of managing utilization of network intrusion detection systems in a dynamic data center in accordance with an embodiment of the present invention.

FIG. 2 illustrates a flow chart showing a method 200 of managing utilization of network intrusion detection systems in a dynamic data center 100 in accordance with an embodiment of the present invention. Reference is made to FIG. 1.

At Step 210, the network intrusion detection systems in the network intrusion detection systems pool 70 are provided in a dynamic data center 100. Each network intrusion detection system in the network intrusion detection systems pool 70 is networked or pre-wired so that utilization of each network intrusion detection system can be based on demand for the network intrusion detection systems in the dynamic data center 100.

Further, at Step 220, a monitoring policy and a plurality of monitoring points to be monitored on a network with any of the network intrusion detection systems in the network intrusion detection systems pool 70 are received. In an embodiment, a graphical user interface is configured to receive the monitoring policy and the plurality of monitoring points to be monitored.

At Step 230, the controller 10 automatically arranges the monitoring of the monitoring points using the network intrusion detection systems in the network intrusion detection systems pool 70 and the monitoring policy.

Figure 3:
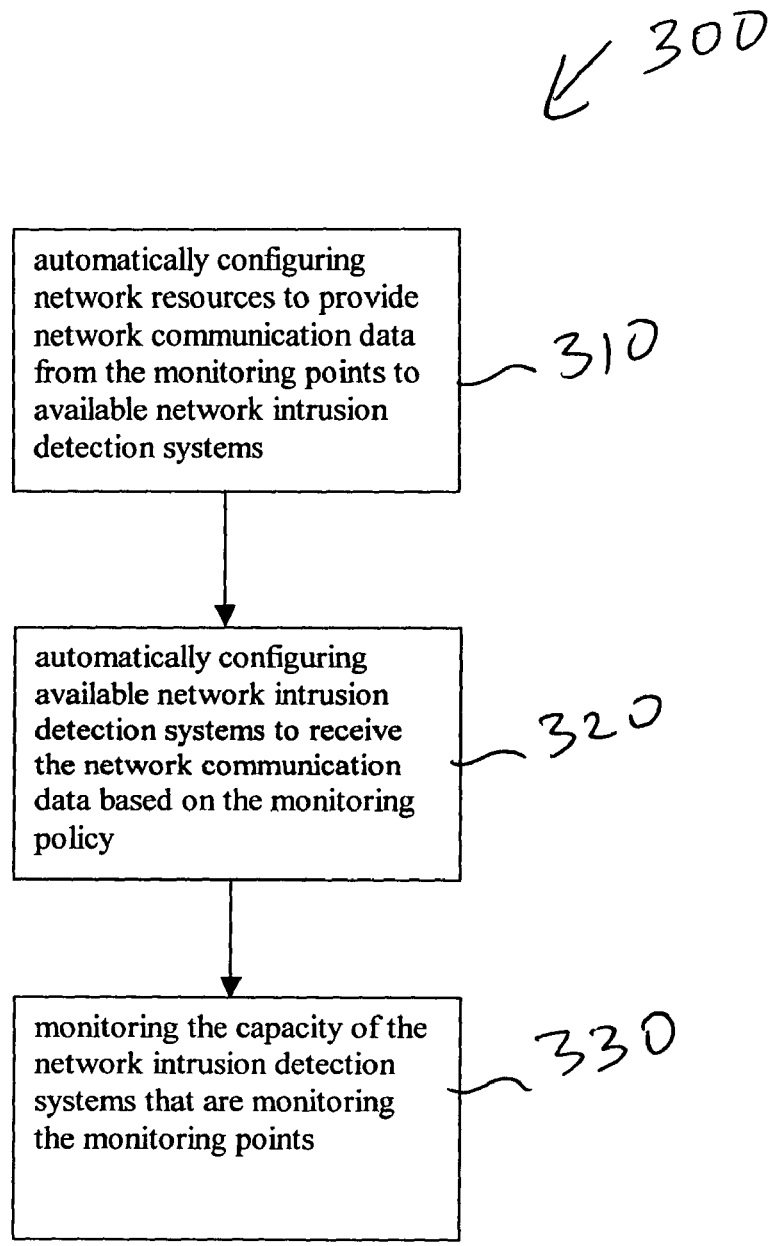
FIG. 3 illustrates a flow chart showing a method of automatically arranging the monitoring of monitoring points in a network in accordance with an embodiment of the present invention.

FIG. 3 illustrates a flow chart showing a method 300 of automatically arranging the monitoring of monitoring points in a network in accordance with an embodiment of the present invention. Moreover, FIG. 3 provides additional details about the execution of Step 230 of FIG. 2. Reference is made to FIG. 1.

At Step 310, the controller 10 automatically configures network resources from the network resources pool 60 and/or in the internal networks (e.g., net1, net2, net3, net4 and net5) to provide network communication data from the monitoring points to a plurality of available network intrusion detection systems from the network intrusion detection systems pool 70.

Moreover, at Step 320, the controller 10 automatically configures the available network intrusion detection systems from the network intrusion detection systems pool 70 to receive the network communication data based on the monitoring policy.

Furthermore, at Step 330, the controller 10 monitors the capacity of the network intrusion detection systems that are monitoring the monitoring points on the network. The controller 10 automatically increases a number of particular network intrusion detection systems receiving the network communication data from a particular monitoring point by selecting additional available network intrusion detection systems from the network intrusion detection systems pool 70 if the network communication data exceeds a capacity of the particular network intrusion detection systems.

Moreover, the controller 10 automatically decreases a number of particular network intrusion detection systems receiving the network communication data from a particular monitoring point by releasing any of the particular network intrusion detection systems to the available network intrusion detection systems in the network intrusion detection systems pool 70 if the network communication data is below a predetermined threshold of a capacity of the particular network intrusion detection systems. Hence, the network intrusion detection systems are deployed and released in an efficient and automated manner.

In an embodiment, the present invention is configured as computer-executable instructions stored in a computer-readable medium, such as a magnetic disk, CD-ROM, an optical medium, a floppy disk, a flexible disk, a hard disk, a magnetic tape, a RAM, a ROM, a PROM, an EPROM, or a flash-EPROM.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of managing utilization of network intrusion detection systems in a dynamic data center, said method comprising:

automatically providing a plurality of network intrusion detection systems, each being networked so that utilization of each network intrusion detection system can be based on demand for said network intrusion detection systems in said dynamic data center wherein said dynamic data center automatically provides said plurality of network intrusion detection systems by automatically provisioning said plurality of network intrusion detection systems from a pool of available network intrusion detection systems enabling automatic modification of a number of provided network intrusion detection systems based on the demand, wherein the automatic modification of the number is selected from increasing the number of provided network intrusion detection systems and decreasing the number of provided network intrusion detection systems;

automatically configuring said provided network intrusion detection systems, at least in part by,
 receiving a monitoring policy and a plurality of monitoring points to be monitored on a network with any of said network intrusion detection systems; and
 automatically arranging the monitoring of said monitoring points using said network intrusion detection systems and said monitoring policy.

2. The method as recited in claim 1 wherein said automatically arranging the monitoring of said monitoring points includes:
 automatically configuring a plurality of network resources to provide network communication data from said monitoring points to a plurality of available network intrusion detection systems from said network intrusion detection systems; and
 automatically configuring said available network intrusion detection systems to receive said network communication data based on said monitoring policy.

3. The method as recited in claim 2 wherein said automatically arranging the monitoring of said monitoring points further includes:
 automatically increasing the number of network intrusion detection systems receiving said network communication data from a particular monitoring point by selecting additional available network intrusion detection systems if said network communication data exceeds a capacity of said particular network intrusion detection systems.

4. The method as recited in claim 2 wherein said automatically arranging the monitoring of said monitoring points further includes:
 automatically decreasing the number of network intrusion detection systems receiving said network communication data from a particular monitoring point by releasing any of said particular network intrusion detection systems to said available network intrusion detection systems if said network communication data is below a predetermined threshold of a capacity of said particular network intrusion detection systems.

5. The method as recited in claim 2 wherein said network resources include one of a firewall, a gateway system, a network switch, and a network router.

6. The method as recited in claim 1 wherein said receiving a monitoring policy and a plurality of monitoring points to be monitored includes:
 providing a graphical user interface to receive said monitoring policy and said plurality of monitoring points to be monitored.

7. The method as recited in claim 1 wherein said dynamic data center is a utility data center.

8. A non-transitory computer-readable medium comprising computer-executable instructions stored therein for performing a method of managing utilization of network intrusion detection systems in a dynamic data center, said method comprising:
 automatically providing a plurality of network intrusion detection systems, each being networked so that utilization of each network intrusion detection system can be based on demand for said network intrusion detection systems in said dynamic data center wherein said dynamic data center automatically provides said plurality of network intrusion detection systems by automatically provisioning said plurality of network intrusion detection systems from a pool of available network intrusion detection systems enabling automatic modification of a number of provided network intrusion detection systems based on the demand, wherein the automatic modification of the number is selected from increasing the number of provided network intrusion detection systems and decreasing the number of provided network intrusion detection systems;
 automatically configuring said provided network intrusion detection systems, at least in part by,
  receiving a monitoring policy and a plurality of monitoring points to be monitored on a network with any of said network intrusion detection systems; and
  automatically arranging the monitoring of said monitoring points using said network intrusion detection systems and said monitoring policy.

9. The non-transitory computer-readable medium as recited in claim 8 wherein said automatically arranging the monitoring of said monitoring points includes:
 automatically configuring a plurality of network resources to provide network communication data from said monitoring points to a plurality of available network intrusion detection systems from said network intrusion detection systems; and
 automatically configuring said available network intrusion detection systems to receive said network communication data based on said monitoring policy.

10. The non-transitory computer-readable medium as recited in claim 9 wherein said automatically arranging the monitoring of said monitoring points further includes:
 automatically increasing the number of network intrusion detection systems receiving said network communication data from a particular monitoring point by selecting additional available network intrusion detection systems if said network communication data exceeds a capacity of said particular network intrusion detection systems.

11. The non-transitory computer-readable medium as recited in claim 9 wherein said automatically arranging the monitoring of said monitoring points further includes:
 automatically decreasing the number of network intrusion detection systems receiving said network communication data from a particular monitoring point by releasing any of said particular network intrusion detection systems to said available network intrusion detection systems if said network communication data is below a predetermined threshold of a capacity of said particular network intrusion detection systems.

12. The non-transitory computer-readable medium as recited in claim 9 wherein said network resources include one of a firewall, a gateway system, a network switch, and a network router.

13. The non-transitory computer-readable medium as recited in claim 8 wherein said receiving a monitoring policy and a plurality of monitoring points to be monitored includes:

providing a graphical user interface to receive said monitoring policy and said plurality of monitoring points to be monitored.

14. The non-transitory computer-readable medium as recited in claim 8 wherein said dynamic data center is a utility data center.

15. A system comprising:
a dynamic data center including:
a plurality of network resources;
a plurality of network intrusion detection systems, each being networked so that utilization of each network intrusion detection system can be based on demand for said network intrusion detection systems in said dynamic data center wherein said dynamic data center automatically provides said plurality of network intrusion detection systems by automatically provisioning said plurality of network intrusion detection systems from a pool of available network intrusion detection systems enabling automatic modification of a number of provided network intrusion detection systems based on the demand, wherein the automatic modification of the number is selected from increasing the number of provided network intrusion detection systems and decreasing the number of provided network intrusion detection systems;
a graphical user interface for receiving a monitoring policy and a plurality of monitoring points to be monitored on a network with any of said network intrusion detection systems; and
a controller for controlling said network resources and said network intrusion detection systems and for automatically arranging the monitoring of said monitoring points using said network intrusion detection systems and said monitoring policy, wherein said graphical user interface and said controller provide at least in part automatic configuring of said provided network intrusion detection systems.

16. The system as recited in claim 15 wherein said controller automatically configures said network resources to provide network communication data from said monitoring points to a plurality of available network intrusion detection systems from said network intrusion detection systems, and wherein said controller automatically configures said available network intrusion detection systems to receive said network communication data based on said monitoring policy.

17. The system as recited in claim 16 wherein said controller automatically increases the number of network intrusion detection systems receiving said network communication data from a particular monitoring point by selecting additional available network intrusion detection systems if said network communication data exceeds a capacity of said particular network intrusion detection systems.

18. The system as recited in claim 16 wherein said controller automatically decreases the number of network intrusion detection systems receiving said network communication data from a particular monitoring point by releasing any of said particular network intrusion detection systems to said available network intrusion detection systems if said network communication data is below a predetermined threshold of a capacity of said particular network intrusion detection systems.

19. The system as recited in claim 15 wherein said network resources include one of a firewall, a gateway system, a network switch, and a network router.

20. The system as recited in claim 15 wherein said dynamic data center is a utility data center.

* * * * *